United States Patent
Kilgore (10) Patent No.: US 8,459,198 B2
(45) Date of Patent: Jun. 11, 2013

(54) BOUYANT HULL EXTENSION PROVIDING LATERAL AND LONGITUDINAL CONTROL FOR LIGHTWEIGHT HULLS

(76) Inventor: Scott Armstrong Kilgore, Grapevine, TX (US)

(*) Notice: Subject to any disclaimer, the term of this patent is extended or adjusted under 35 U.S.C. 154(b) by 154 days.

(21) Appl. No.: 13/010,628

(22) Filed: Jan. 20, 2011

(65) Prior Publication Data

US 2011/0232557 A1  Sep. 29, 2011

Related U.S. Application Data

(60) Provisional application No. 61/317,624, filed on Mar. 25, 2010.

(51) Int. Cl.
*B63B 1/00* (2006.01)

(52) U.S. Cl.
USPC .......................... 114/271; 114/288

(58) Field of Classification Search
USPC ................ 114/271, 284, 285, 288, 290, 291
See application file for complete search history.

(56) References Cited

U.S. PATENT DOCUMENTS

| 4,584,959 | A | | 4/1986 | Allison | |
|---|---|---|---|---|---|
| 4,813,365 | A | | 3/1989 | Lindstrom | |
| 5,224,436 | A | | 7/1993 | Stricker | |
| 5,562,511 | A | * | 10/1996 | Blanchard et al. | 440/49 |
| 6,000,357 | A | * | 12/1999 | Allison | 114/271 |
| 6,629,507 | B2 | * | 10/2003 | Biddison | 114/271 |
| 2011/0126751 | A1 | * | 6/2011 | Muller | 114/285 |

* cited by examiner

Primary Examiner — Lars A Olson (57) ABSTRACT

An improved stern design for many types of small watercraft to eliminate "tail dragging", porpoising, oversteer and "slide out", improve longitudinal tracking, and provide faster planing at lower speeds. This hull extension, consisting of two buoyant sponsons extending astern of the motor output, supports the weight of the entire motor propulsion unit, extends the planing surface, shifts the center of buoyancy rearward, resulting in an ability to maintain an even fore-aft keel in a very lightweight hull. Under acceleration and cruising, high pressure under the extensions along with an improved center of gravity keeps the boat from tail dragging. Interior chines formed as part of the inner lower surface of the sponsons provide straight tracking under power, even without other hydrodynamic aids, and provide resistance to oversteer or "slideout" in turns. The long sponson extensions protect an outdrive system from contact at the stern or sides of the boat.

7 Claims, 8 Drawing Sheets

BOUYANT HULL EXTENSION PROVIDING LATERAL AND LONGITUDINAL CONTROL FOR LIGHTWEIGHT HULLS

I claim priority of provisional application No. 61/317,624 Filed: 25 Mar. 2010

FIELD OF THE INVENTION

This invention presents an improved stern or stern extension design which controls and corrects a number of handling and trim problems associated with small or lightweight inboard or outboard driven boats. These problems include:

1) Oversteer, otherwise known as "slide out",

2) "Tail Dragging", a common and an undesirable trim attitude in which the stern rides too low in the water, causing the bow to rise, and usually results in less efficient operational performance, and even possibly discomfort or danger to the occupant(s) of the craft. This condition can occur at rest, or in any normal operating parameter such as acceleration, subplaning or displacement speeds, or planing speeds.

3) Porpoising, an oscillation where the bow rises and lowers in the water repeatedly while under power.

4) Poor planing performance due primarily to item 2, above, sometimes item 3, above, that results in that boat riding at an inefficient angle to the surface of the water. In order for a planing hull to run most efficiently through the water, it should run over the surface of the water, if possible. It should be riding at as close to a 0° angle to its bow or primary wave. In general, as little contact with the water is better for planing, though this can produce control problems. It should be noted that since very small hulls have little contact with the water, reducing contact to a minimum could be undesirable from a control standpoint. Also, if reducing contact means the remaining hull contact is at an angle that causes part of the hull to dig in (I.E.: not run at the 0° angle to water pressure explained above), performance will suffer due to more drag being created.

This stern design provides an even keel to very light hulls using heavy motors. It allows the use of heavy outboard motors on boats, relative to the hull weight without the use of compensating weight or ballast. It shifts the Center of Gravity forward and provides a buoyant stern while maintaining stability. For example, it provides an even keel to even very light 30 pound hulls supporting 60 pound motors, unloaded, or loaded, at rest, and at all the normal operating parameters listed above. In application to larger small craft, it can be used to design a hull that can support as much as a 600 pound motor and drive system or additional fixed gear in a technologically sophisticated 300-400 pound hull that could also support several passengers and gear, all while keeping a static and operational even keel. A lighter weight hull, combined with a flatter running, more hydrodynamically efficient hull should plane faster, use less fuel, and have more capacity for cargo.

BACKGROUND OF THE INVENTION

A common problem with very small craft such as canoes, kayaks, Jon boats, small speedboats, rigid inflatables, dinghies, and even larger small craft such as bass boats and bay boats has been what is commonly known as "tail dragging". In some designs, this occurs at rest due to too much weight at the stern. In others, tail dragging occurs in operation, during acceleration, displacement mode operation (subplaning) or when on plane. In many designs, the problem arises in more than one mode of operation, sometimes at all times.

Another problem has been substantial weight increase to the point that even a small boat designed for use by one person can not be carried by one person as the weight, even without an efficient motor installed, generally grows to 100 pounds or more. A heavier hull is frequently used to balance a boat and give it more stability.

First, some background on the art, as it exists for lightweight craft that should be light enough for a single person to pick up and transport to and from the roof of a car to the water.

For the purposes of this invention and category, a light hull, heavy motor combination shall be defined as either of three conditions:

1) A motor installed anywhere in the hull of a boat that will cause the boat to tail drag or list to the rear, raising the bow, when in an unloaded or underloaded condition. This is without adding ballast to the hull.

2) A motor or motor package mounted toward the rear of a boat that exceeds 75% the weight of the boat without ballast.

3) A boat where the combination of desired fixed equipment, and or motor(s) added to the craft causes the boat to tail drag without adding ballast.

Solutions to the problem of using a heavy motor on a light craft have been numerous. One still common crude solution involves placing weights in the bow to compensate for the weight of a rear-mounted motor on a square stern kayak or canoe. Carrying an additional 50-60 pounds of weights to stuff into the bow is a less than elegant way to solve the problem of the bow of a canoe sticking up at as much as a 20° angle even after the operator gets in the boat in a typical position near the motor. Even with weight added, most canoes do not ride level and adding weight to the bow reduces cargo capacity. And if cargo is added in the bow to hold the bow down, it can be hazardous retrieving it.

Kayaks with motors attached at or near the stern of the craft tend to ride so tail heavy in the water that the stern is sometimes actually underwater. One common solution to that issue has been to mount a motor on one side of the canoe or kayak on a bar with a corresponding weight on the other side of the boat to compensate. This practice is usually limited to electric trolling motors because the added weight can become a problem if even a 30-40 pound 2 hp outboard motor is added. Even a 30 pound motor mounted in this way becomes a motor and mount package weighing at least 70 pounds. Most canoes and kayaks are not structurally designed to really take the weight and vibration of a motor, mount, and compensation weights that these devices would subject the boat to. In addition, installing any motor in this manner makes the boat difficult or impossible to paddle or row.

Another solution has been mounting a trolling motor, electric outboard, or ICE outboard engine amidships through a hole in the hull. Some of the commercial designs have incorporated a mount that allows the motor to lifted or tilted out of the water. So far, unless these use a specially designed motor head, draft is deeper than an outboard motor mounted in a more conventional manner. All of the electric systems have substantial draft. Disadvantages to these designs include reduced cargo capacity, deep draft compared to shallow drive portable outboard motors, weight, and performance that is usually not much faster than a good kayak, albeit, without the work.

Better results have been produced by kayak and canoe-like craft with an inboard power plant driving a propeller or a water jet drive. Some of these, such as the commercially available Surfango and Mokai powered kayaks offer very good performance and reasonable economy. They are single person boats. The Surfango Adventurer and similar boats are very high performance craft that do, in general, ride more bow high and "tail drag" more than would be desirable. The Surfango Adventurer still provides over 25 mph from only 9.5 hp due to its kayak-like hull. The Surfango weighs 120-130 pounds. The Mokai is a more practical craft that produces 14 mph from a 6 hp inboard jet pump. It has the advantage through the invention described in John Murray's U.S. Pat. No. 5,937,785, of having a removable inboard engine and water jet pump system. This didn't, contrary to the assertions in U.S. Pat. No. 5,937,785, make the commercially made boat light enough to be actually transported by one person without aid. The bare hull weight is still 100 pounds. That would be more than most people could carry down to the water, much less put on top of a car or van by themselves. The biggest problems with these craft are weight and the use of proprietary jet pump components that require the purchase of component replacement parts from a small manufacturer. This latter problem may limit the useful life of the product. While not a performance consideration of this patent, it is a convenience and marketing consideration of my design. The ability to replace virtually any attached part of the boat, including the drive system, with commonly available parts, combined with a durable, repairable hull enables a design that has a very long service life.

The weight of these inboard designs result in single person boats that are not transportable by one person.

Static tail dragging is also a problem in many other small craft when an outboard motor is placed in a conventional position at or near the stern of the boat. It is less common in boats with inboard engines due to the center of gravity being located several feet forward.

Common solutions to the problem include weight distribution changes such as ballast, or heavier hulls. Active ballast solutions such as water chambers in hulls which fill at rest and drain as the boat accelerates have been either proposed or used.

These solutions result in less performance, more time to achieve plane, less efficiency, and lower capacity for cargo.

Adjustable and non adjustable trim tabs have been used to adjust the fore-aft attitude of boats at speed since at least the 1930's. Trim devices on outboard engines have also been used for the same purpose in more recent years. Since these only effect the trim of boats while under forward movement, they are not directly useful to the purpose intended.

Rear sponsons or buoyant extensions have been incorporated into the stern of boats to help control the problem of tail dragging at rest or subplaning speeds. This is well established in the art.

U.S. Pat. No. 5,224,436 by John Stricker is a very inclusive patent that discloses a stern extension or sponson. This development differs significantly from my development in several respects.

1) Stricker's design (also U.S. Pat. Nos. 4,584,959; 6,000,357) is designed as a step at the rear portion of the hull to act as a buoyant structure at subplaning speeds when the hull is operating in displacement mode. At planing speeds, his stepped extension is intended to be ventilated as the hull rises on plane, having no contact with the water. Should water or air forces force the bow of the boat up, the extension sponsons would make contact with the water, slowing the boat and forcing the boat into a more level plane, at least once the ventilation was broken. A disadvantage of this is that the slowing produced as drag increases, followed by the re-acceleration as drag decreases can cause porpoising.

2) Stricker's tests on a 12 foot fiberglass boat with a beam of 3 feet indicate much lower efficiency and planing ability than my three 10 foot test craft, each with a 29 inch beam. Since longer hulls are generally considered more hydrodynamically efficient, a top speed of only roughly half of my tested speed with 4 hp used on both craft indicates a significant increase in efficiency for my design. My design also results in a solid cruising plane before Stricker's earlier design even reaches planing speed. Stricker's test boat had a tested total weight with driver of about 400 pounds and a total length of 12.75 feet. My test boat had a total loaded weight of about 320 pounds and a length of 10.25 feet. The length of his extensions were 9 inches. In my design the extensions are narrower, but 27 inches long. I experimented with short extensions and found their improvements to performance were substandard. A short 13 inch extension gave results similar to Stricker's. If I had had knowledge of Stricker's tests, I might not have even attempted this modification.

Stricker's development seems to be similar to the sponsons used on at least one model of commercially available large Jon boat.

Lindstrom's design presented in U.S. Pat. No. 4,813,365 presents a solution that includes a stern extension that follows the basic contours of the main hull in a tumblehome fashion. This is mostly presented for esthetic reasons. It does not depend upon a stepped rear extension, unlike most other uses of buoyant sponsons. It however, does depend upon reflex chines and a double deadrise hull structure for most of the hydrodynamic force.

The rear extension in Lindstrom's design calls for "an engine mounting system which positions an outboard engine astern". It places the engine in the far astern mounting position on the back of the flotation chamber that serves as the combination engine mount. While this removes the outboard engine mounting well from the cabin of the boat, it still places the motor on the end of a pendulum, just like a normal outdrive, requiring a much heavier hull to compensate for the load at the very stern of the boat. The 2 foot long extension in U.S. Pat. No. 4,813,365 would not have enough buoyancy to completely support the weight of an appropriate outboard or inboard/outboard propulsion unit on the size hull shown in the drawings without significant draft, nor does it actually change the center of gravity or buoyancy other than simply lengthening the hull. It is really a motor mount box that is an extension that positions the engine in a normal outboard position.

This brings us to the purposes of my invention.

OBJECT AND ADVANTAGES OF THE NEW ART

What is not well established are rear sponsons which act as planing surfaces, buoyant support for the engine package, and a method to keep the boat on a relatively even keel in static and forward movement, loaded or unloaded. As an additional new feature, my invention incorporates the ability to improve tracking and turning control. This is particularly useful on designs without hard chines, hard keels, or any other hydrodynamic longitudinal and lateral control devices, or limited hydrodynamic devices to aid tracking and produce stable tracking in turns without oversteer or "slide out". In addition, the sponsons I have developed can be used to create small powerboats that are light enough for most healthy single individuals to put on top of a car, take off of a car, and transport by hand, without devices, to the water.

These sponson hull extensions can also serve as protection from rear contact for an outboard motor or stern outdrive in the raised or lowered positions.

An outline of the advantages and objectives of my invention:
1) Provides an even or nearly even fore-aft keel attitude at all normal operational conditions including:
    A) At rest; with or without a load.
    B) During acceleration
    C) During subplaning or displacement mode cruising
    D) While on plane.

This is due to the pair of large long buoyant hull extension sponsons 1 designed to support the load of the motor package, combined with an inset motor package amidships from the extension sponsons.

2) Provides good acceleration and quick planing, even with very small motors.

This is due to the buoyancy of the sponsons 1, combined with an extension of the planing pad 6 surface into the sponsons. Also, the thrust of the motor is directed into the well or tunnel 11 between the two sponsons 1, and under the sponsons, creating some lift. High pressure water also flows past the interior hard chines located on bottom inside walls on either side of the center well.

3) The hard interior chines provide strong tracking and high resistance to oversteer and "slide out" or "spin out". This is actually enhanced on plane as the hard interior chines forming the interior bottom edges of the sponsons are always in a high pressure area. Any lateral forces meet resistance from the internal well surfaces.

4) Prevents porpoising by providing an extension of the planing pad 4 to the stern of the motor/motor outlet and buoyancy to help keep the pad 6,4 in proper contact with the water.

5) Allows much lighter hulls due to better fore-aft balance. This, in turn, allows either greater load capacity or better performance.

6) On larger hulls can also provide a static swim deck 15 or loading platform 15 without change of attitude, or little change of attitude. It can also provide a deck for fixed equipment, provided this is entered into the buoyancy load calculations. A lowered deck, such as in FIG. 20-25, can also provide a safer stern entry from the water or dock, particularly when combined with the cover deck 15 protecting, or covering the well for the outdrive, outboard, or water jet outlet.

7) The boat can be constructed with a limited width well 11 that can be used to restrict the size of installed outboard motors for safety purposes. While this can be applied to larger craft, this is particularly useful on small light craft, such as modified canoe and kayak forms.

8) The limited width of the inner transom 2 formed by the well can also strengthen and stiffen the motor mounting area and inner transom. On formed or molded monocoque hulls designed with the extension sponsons 1 integral with the complete hull, this can allow reduced material without loss of strength. It can also reduce the size of the materials for the motor mounting area in hulls constructed of separate parts, such as, but not limited to, welded metal, riveted metal or wood hulls. These constructions would have to carefully tie all sections together in best engineering practice.

9) Provides protection to an outboard motor from the sides or rear. On a small craft that can also be paddled, the motor can be protected in the "tilted up" position for more efficient paddling.

10) On larger hulls, provides a location for a maintenance chair or tray in the well to work on an outdrive or outboard motor. This can also be used to shield spray from the prop or jet outlet. This can be built into the well or temporarily attached as needed.

Figure 1:
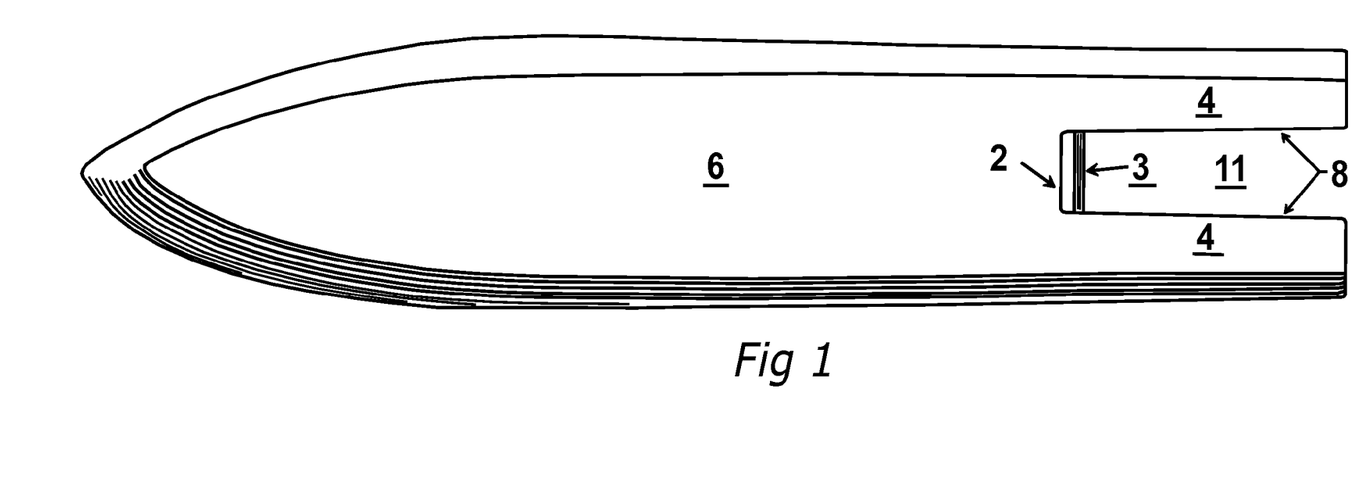
FIG. 1—Underside view of a typical small kayak-like hull featuring the extension sponsons 4 in a typical integral installation. Shows a smooth planing pad hull transition from the underside.
Figure 2:
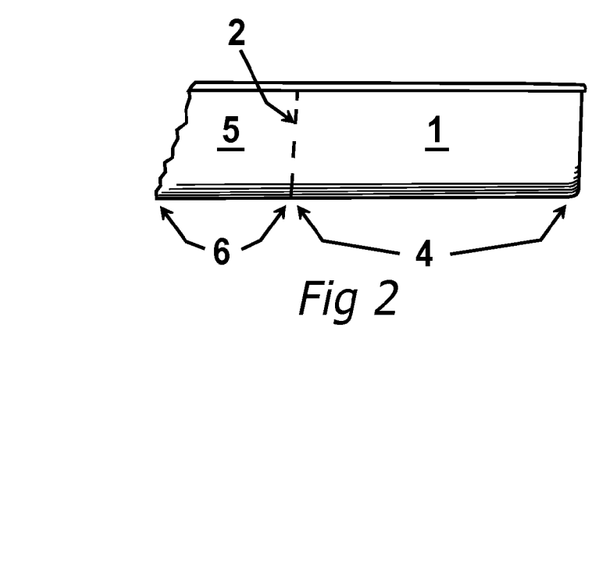
FIG. 2—Fragmentary side elevation showing only the integral extension sponson as integral with the hull on the hull featured in FIG. 1. This view shows the transition of the main hull 5 planing pad 6 to the sponson planing pad 4 surfaces.
Figure 3:
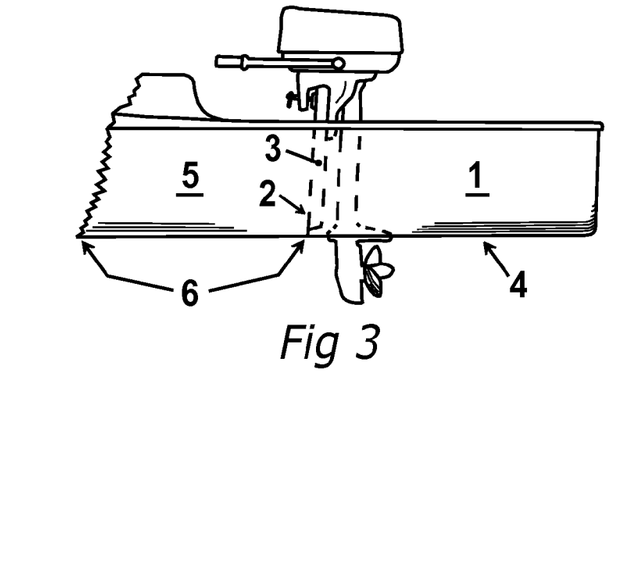
FIG. 3—Fragmentary side elevation showing the integral extension sponson with a small outboard motor as might be installed on a typical small kayak or canoe style hull.
Figure 4:
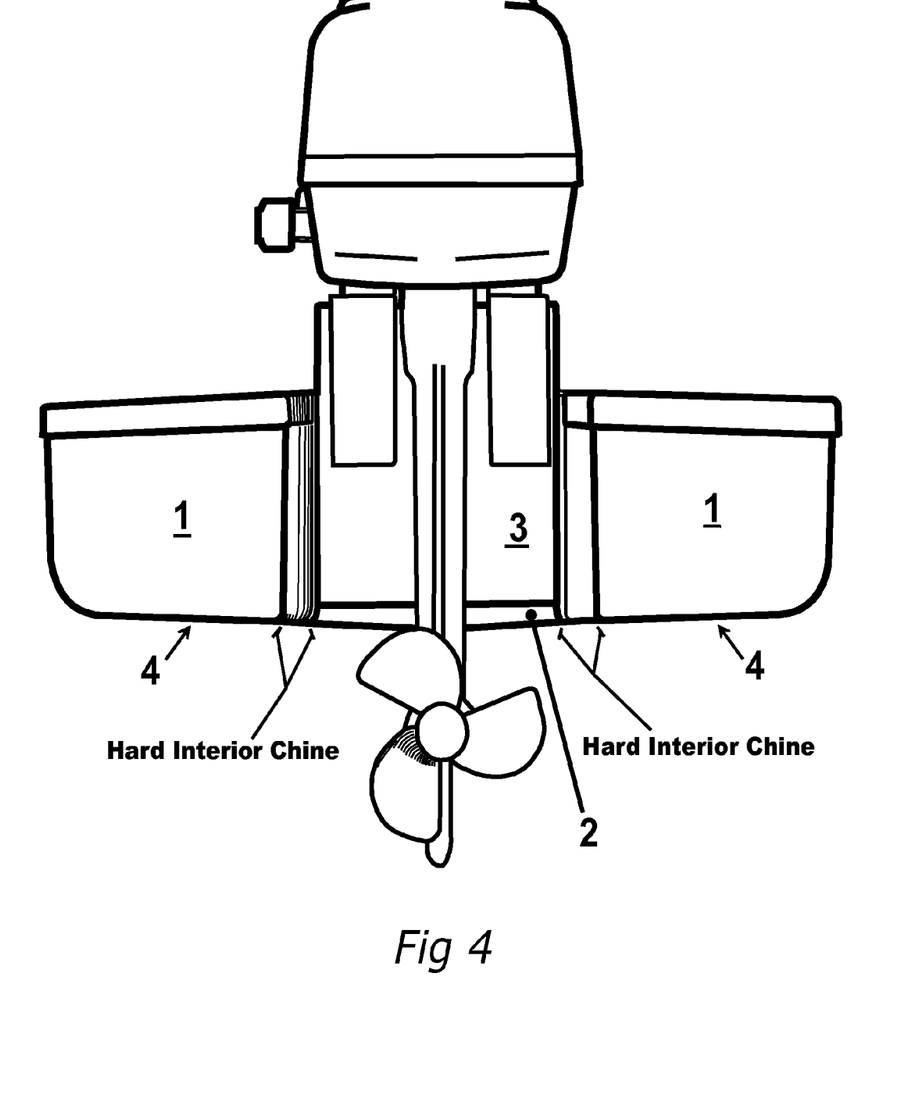
FIG. 4—Aft elevation shows a typical profile of the Hard Interior Chine and shows the sponson planing pad following the general shape of the main hull.
Figure 5:
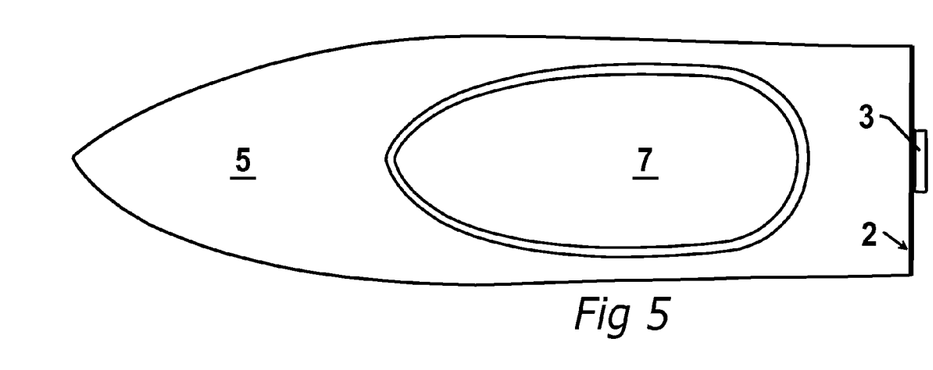
FIG. 5—Overhead or top plan view of the typical kayak hull without detachable sponsons.
Figure 6:
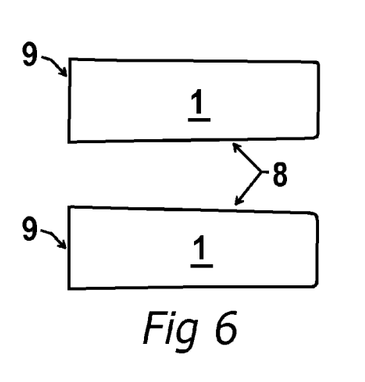
FIG. 6—Overhead or top plan view of typical detachable extension sponsons to be attached to the hull in FIG. 5.
Figures 7, 8, 9:
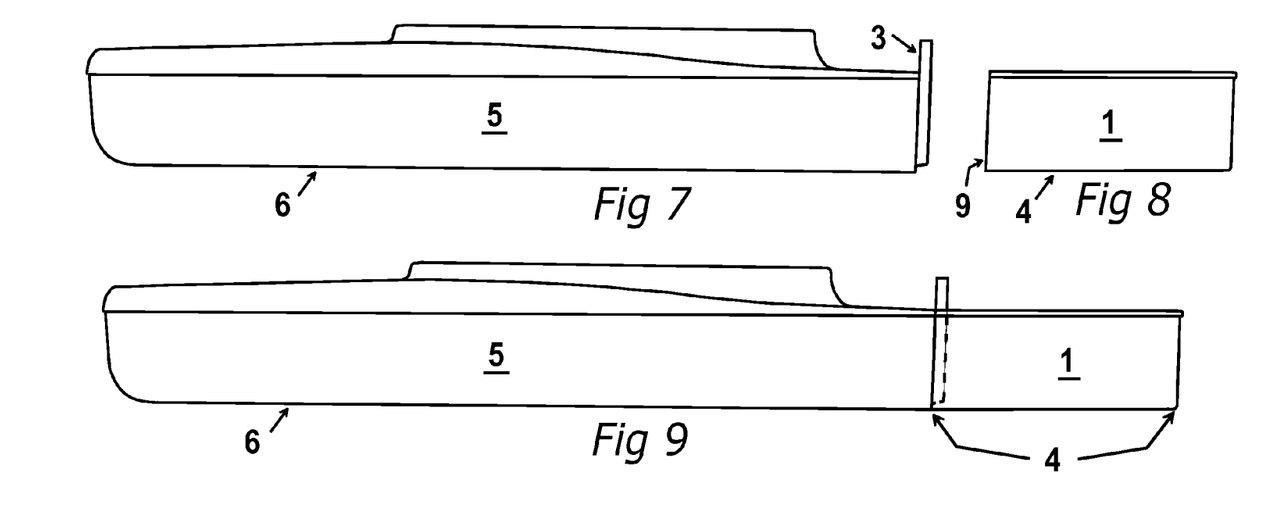
FIG. 7—Side elevation of the typical kayak hull without detachable sponsons of FIG. 5.
FIG. 8—Side elevation of typical detachable extension sponsons to be attached to the hull in FIG. 5.
FIG. 9—Side elevation showing the assembled hull with attachable extension sponsons without motor installed.
Figure 10:
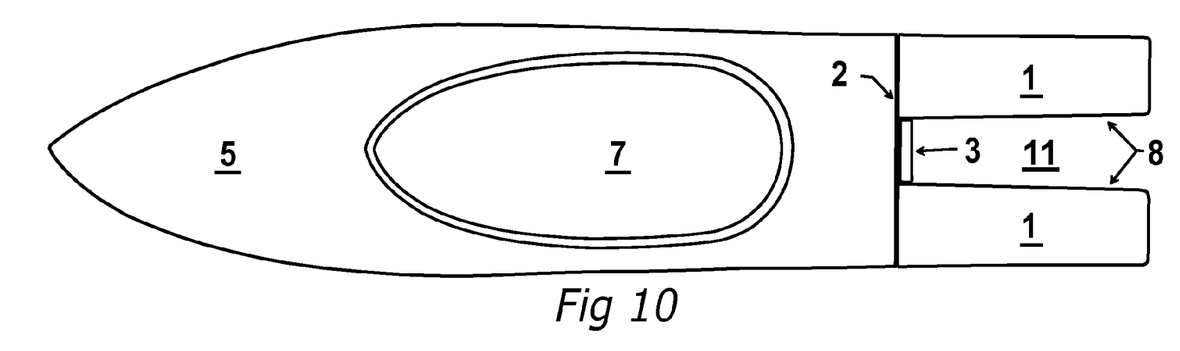
FIG. 10—Overhead or top plan view of the assembled hull with attachable extension sponsons without motor installed.
Figure 11:
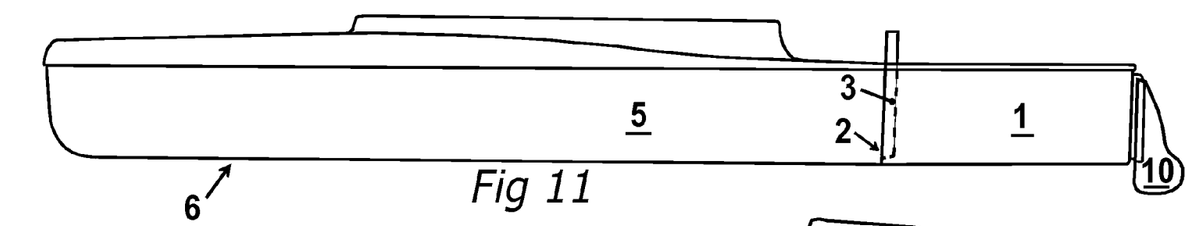
FIG. 11—Side elevation showing the assembled hull with attachable extension sponsons without motor installed and with an optional rudder 10.
Figure 12:
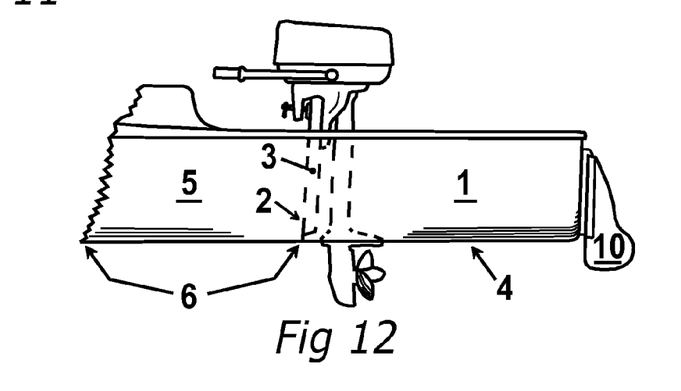
FIG. 12—Fragmentary side elevation of the assembled hull showing a hidden view of a small outboard motor, the planing pad 6 of the main hull 5 transitioning to the planing pad 4 of the extension sponson 1, with a rudder 10.
Figure 13:
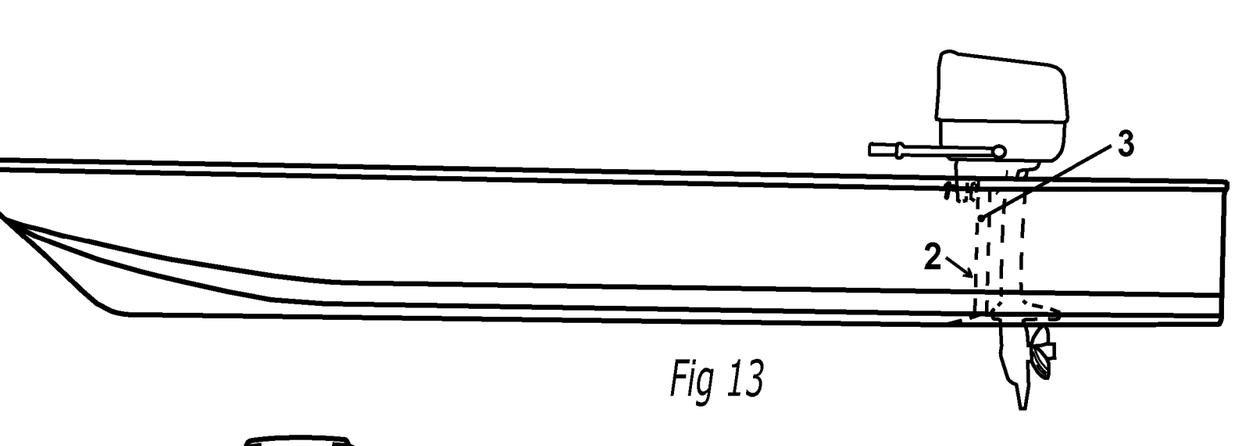
Figure 14:
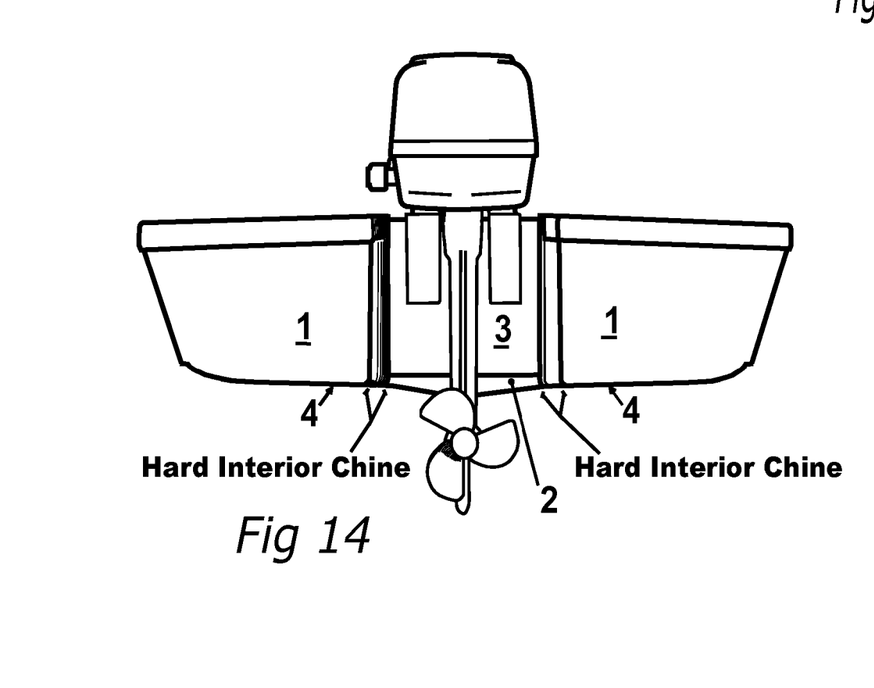
FIG. 14—Aft or stern view displaying a generic, nearly flat bottomed hull.
Figure 15:
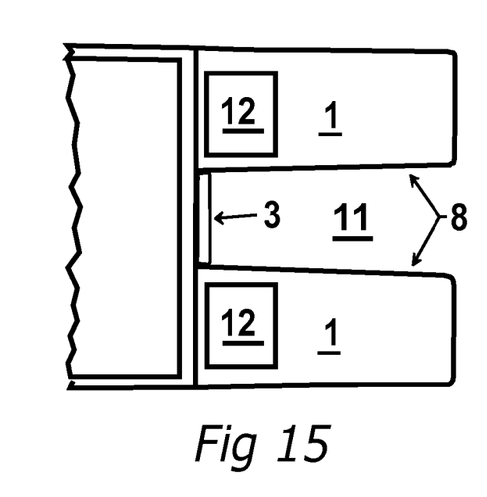
FIG. 15—Fragmentary top plan view showing the addition of possible storage compartments on either side of the outboard motor View does not show full width or beam of sponson section.
Figure 16:
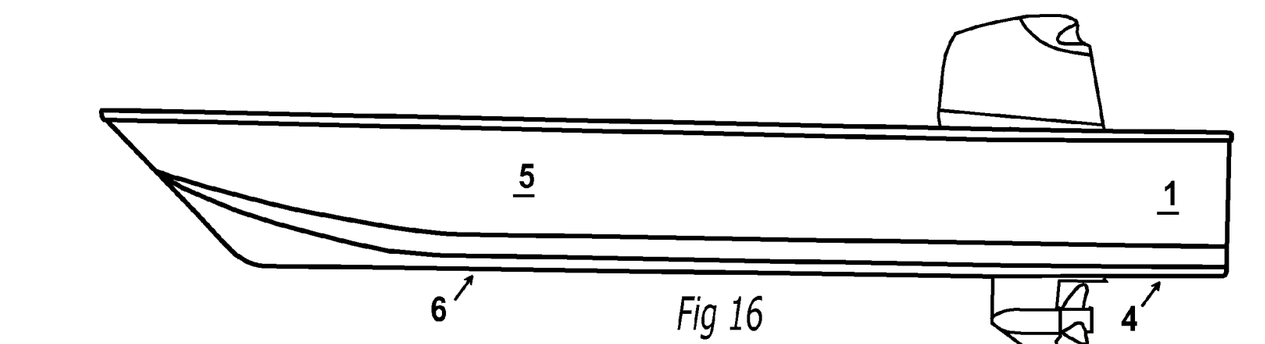
FIG. 16—Side elevation showing an outboard motor of about 450 pounds with suitable sized extension sponsons. For purposes of this example a larger load was calculated to allow for some fixed equipment and storage. The smooth transition of the planing pad 6 of the main hull 5 to the planing pad 4 incorporated into the sponson 1 is portrayed.
Figure 17:
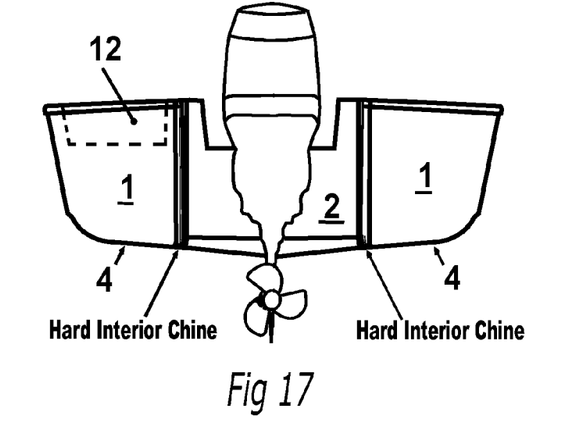
FIG. 17—Aft elevation shows a typical profile of the Hard Interior Chine and shows the sponson planing pad 4 following the general shape of the main hull. This view also shows an hidden view of a storage compartment 12, that is well above the waterline, insuring adequate buoyancy and flotation space.

11) The Extension Sponsons 1 can be built as an integral part of the hull 5 or as watertight sealed buoyant sponsons FIG. 6,8,15 that attach to a hull. The integral structure can save weight and materials as all the structure of two transoms can be avoided. The removable sponson extension or extensions can provide separate flotation chambers to support part of the boat should another part be flooded. In a very small craft, detachable sponsons can be removed so the boat will fit into a smaller space, as shown in the examples featured in FIG. 5-12, 26. This would allow a 10 foot or longer boat to fit into the 8 foot space available in a van or pickup.

SUMMARY OF THE INVENTION

My design is for a stern hull extension intended to act as a buoyant hydrodynamic control surface at all speeds and at rest. Since it is intended as an extension that follows the lines of the parent hull, it can be adapted to a wide variety of current or future hull designs, primarily of the planing type. It provides a nearly level attitude at rest with no load, only the engine as load, with cargo and occupant(s) at rest, at displacement (subplaning speeds) under acceleration, and at planing speeds. Unlike any other designs, the extension sponsons in my design are intended to fully support the engine motor package without lowering the transom of the boat to a point where it would raise the bow, even in a very light hull. This design also moves the longitudinal center of gravity forward, particularly critical for a hull weighing as little as 10% of the Gross Weight Rating of the craft. Due to the development of the interior chines as an element of the hull extension sponsons, excellent tracking and prevention of oversteer or "slide out" is achieved, even with a smooth flat bottom hull, such as on a Jon boat and variations of square stern canoe and kayak hulls. These hulls can provide excellent pads as planing surfaces. However, they need "direction" to achieve a quick and efficient plane by providing either a forward Center of Gravity or trim to redirect hydrodynamic force, lifting the stern of the hull in order to keep the bow from rising, causing the boat to not tail drag, not just during acceleration, but during most other operational activities.

At first, my rear sponson design would seem to be a less efficient method since the general accepted practice in the art of a planing hull is to have as little contact with the water as is possible. However, in very light, small craft with a very shallow draft, surface contact can be minimal at higher planing speeds. Preventing problems such as tail dragging (squatting), oversteer, (I.E.: tail sliding or "slide out"), and tracking control without introducing drag inducing devices such as trim tabs, and various strakes, exposed chines, or hard keels can be difficult. This extension sponson design does not preclude the use of any other hydrodynamic feature. It is intended to make other hydrodynamic trim features for longitudinal tracking, or fore-aft trim unnecessary or less necessary.

My hull extension or sponson design presents limited contact with the water at the stern of the boat due to the narrow extensions designed to provide a mid-rear placement of the outboard engine or the outlet of an inboard power unit's waterjet or propeller.

The design places the outboard motor, or inboard drive prop or water jet outlet toward the front of the well or tunnel formed between the extensions. This placement helps direct more of the thrust from the engine under and in the middle tunnel formed by the sponson hull extensions. This directs more of the flow past the interior chines, aiding longitudinal tracking, creating some lift, and reducing the wake generated by the motor's propeller or jet drive.

In my design, the hard Interior chines built into the rear hull extension 1 provide the hydrodynamic forces necessary to laterally stabilize the boat in turns and provide straight tracking, even on a rounded or flat bottom hull design. These hard chines aft of the thrust of the motor have the advantage of always being in a high pressure area. This either makes chines forward of the rear section unnecessary, or less necessary. This is a departure from current practice.

The design provides a well for the motor to be raised or tilted up, preventing damage to the outdrive from contact to the side or rear of the boat. In a very small craft, such as adaptations to a canoe or kayak hull FIG. 1-12,26, this permits the motor to be tilted out of the water so the boat can be paddled. At the same time, the motor is protected from damage. While other designs can allow the motor to be tilted or raised to allow paddling, most place the motor to the front or side of the operator, either restricting vision, paddling, or both.

BRIEF DESCRIPTION OF THE DRAWINGS

In order to better understand the elements of the invention and the drawings, I will first define the common item elements of the drawings as follows:
Hard Interior Chine—These are the lower longitudinal elements running from the inner transom 2 to the stern of the boat. They form right angles, or near right angles
1—Sponson Hull Extension; integral with hull, or attached
2—Inner transom
3—optional external motor mount
4—Rear planing pad surface on the extension sponsons, an extension of the pad surface and hull design of main hull.
5—Main or parent hull
6—Planing pad of the main hull
7—Cockpit
8—Hull surfaces forming the well formed by the extension sponsons
9—Lead contact surface for attached extension sponsons to be attached by any suitable means to the inner transom
10—Optional Rudder in a typical location
11—The well or tunnel formed by the extension sponsons
12—Storage bin or compartment
13—Jet pump outdrive nozzle
14—Step
15—Deck, platform, or swim platform, fixed, hinged, or removable, located over the well.

DRAWING VIEW DESCRIPTIONS

None of the illustrations are intended to represent a specific hull design. They are used as representations showing the typical generic design and integration of the invention on various size hulls. The design of the main hull is not a part of the invention, though the invention is intended to allow beneficial changes to the main hull design. The illustrations of various size hulls show that the design principals of the invention can be scaled to adapt to a variety of hulls with similar benefits in each design. Note that the sponson design provides protection of the raised outboard motor from contact at the stern as the motors and boat size are increased.

FIG. 1-12 show details of a typical application to a typical small kayak style hull. Also applies to similar canoe style hulls. This application of the design used with portable outboard gas or electric outboard motors can provide lightweight craft that can be easily carried by one person.

FIG. 13-15 illustrate an application to a typical small fishing boat, flat bottomed boat, Vee or deadrise boat, round bottom boat, Skiff, Jon boat, dinghy, or similar type craft that typically uses a portable to medium sized outboard motor using tiller or remote steering. The sponsons can be attached or integral with the hull. Storage 12 can be accommodated on either side of the motor. The Hard Interior Chines integral with the sponsons allow a flat bottomed hull design without chines to have good tracking, lateral resistance to oversteer, fore-aft stability and lighter weight.

FIG. 13—Side elevation. If the boat was assumed to have an overall length of 13-14 feet, the sponsons, as proportioned, could safely support 130 pounds of motor and storage at a 4 inch draft. A 200 pound motor and storage would draw about 6 inches at rest.

FIG. 16-20 represent similar styles of hulls presented in FIG. 13-15 as applied to larger sport boat hulls of 18 feet or more. The basic scale of these drawings represents a hull of about 20 feet in length. The sponsons on this size hull are large enough to also serve as loading platforms.

FIG. 21-25 represent typical alterations within the invention suitable for inboard/outboard outdrive systems and inboard jet pump systems. For simplicity, a jet pump nozzle 13 is used to represent the outdrive. FIG. 21,23,24,25 also present a deck or platform 15 over the well 11 that may be used as a loading platform or swim deck. This deck would also serve as protection from the outdrive system.

DETAILED DESCRIPTION OF THE INVENTION

While referring to the drawings, this invention consists of two sponsons 1 acting as buoyancy and flotation chambers attached in direct and complete contact without gaps at the edges with the transom 2 of any suitable hull 5. These sponsons have nearly parallel inner lower surfaces running parallel to the fore-aft centerline of the existing hull that form an Interior Hard Chine. This is a hard chine in that it is preferred that these edges have a small radius of curve consistent with the best manufacturing practice with the materials used. There is no need for the edges to form a sharp corner. The interior vertical edges of these parallel surfaces denoted by 8 in the drawings, form a well 11 starting at the inner transom 2 formed by the attachment or integration of the sponsons 1 to the hull 5. The well should form walls as close to perpendicular to the waterline as is practical. This definition of as practical shall be considered to mean no more than a 15° tumblehome vertical angle toward the opposite sponson. The walls of the well may attach the sponsons 1 at the top of the well 11 as in FIG. 24 with an arch most of which should start the curve above the static waterline. This well 11 is open to the stern of the boat. This well 11 is closed toward amidships of the boat, except for any tunnel provided in the original hull design this attachment may be attached to. The lower surfaces and outer surfaces of the sponsons follow the same design of the main hull to form a smooth planing pad running from the main hull's planing pad 6 to the surface created by the extension sponsons 1 planing pad 4. The height of the sponsons should be sufficient for the top surface to be completely out of the water in normal operation. Since these sponsons form buoyancy chambers to support the motor completely and provide control surfaces provided by the interior chines, calculations are made, as detailed later, so that they may be designed to fit a wide variety of hull sizes and types to support a wide variety of motor types and sizes.

After research and experimentation, it was decided that a kayak or canoe style hull offered the lowest potential drag in a small craft. As I had designed a lightweight recreational kayak that would almost plane at 6 mph, I used the forward ⅔rds of this design as the first core hull in which to attach the extension sponsons.

The Test Hulls

As mentioned previously, a common problem of many small powerboats, and canoe or kayak hulls sporting motors (inboard and outboard) is the tendency to "tail drag" either as a general trim condition or under powered operation. This is particularly true of very lightweight designs. Originally, the purpose of the development of my Twin Tail stern hull extensions was to provide an efficient, stable, very lightweight powerboat that could be easily loaded on the roof of a car by one person. The engine could be stored in the trunk, likewise loaded and unloaded by one person. The immediate result of this development is a 10 foot 3 inch long recreational kayak-like craft weighing less than 40 pounds that can use various 4 stroke outboard engines currently weighing between 29 and 60 pounds. This small craft can be steered simply by the operator leaning, or with a paddle, eliminating the need for complicated steering gear. Despite the light weight and a total capacity of over 280 pounds, this craft exhibits a nearly level keel from unloaded rest, through acceleration and while on plane. Tracking is straight despite a nearly flat pad, semi-round main hull, and little or no contact of the lower part of the bow with the water when the boat is fully on plane. The boat is also resistant to "slide out".

Both favorable conditions are the result of the development of longer sponson extensions that incorporate hard interior chines, buoyancy sufficient to support at least the weight of the motor, and are an extension of the general hull design of the main hull. The design can allow tapering of the rear extensions and nearly any realistic and appropriate shape of curved, angled, or straight rear transom(s) as long as the buoyancy calculations at least support the weight of the heaviest motor expected to be installed. For practical matters, most designs will work best with a standard nearly vertical transom, generally perpendicular to the stern.

As a result of this development, lighter hulls can be designed of higher strength materials. Forces pushing the bow up are resisted by the larger buoyant sponsons that also act as extensions of the planing surfaces of the main hull. This keeps the boat's planing pad area in contact with the water despite the lighter weight.

Test Results of My Test and Pre-Production Boats

Planing speed is achieved at only 6.2 mph with a 2 hp outboard motor. Top speed with 2-2.5 hp outboards over a short distance run of under 500 feet is 9.9 to 10.7 mph, dependant upon water conditions and temperature. Extended full throttle runs over 1 mile reach typical speeds of at least 11.5 mph with several different 2-2.5 hp outboards. Fuel economy at cruise speeds of 8 to 9 mph average over 40 mpg on a variety of courses. Best fuel economy at planing speeds in testing topped 48 mpg. With a Yamaha 4 hp outboard, top speeds of 14 mph are quickly and easily reached with a general 75-80% power cruise speed of 12 mph yielding 36-40 mpg over a variety of routes, and conditions. Planing is achieved very quickly with almost no squat (bow rise) at full throttle.

Sponson Extension Calculation

The general buoyancy calculation for the purposes of this invention can be carried out by either of two methods.

Method 1) In already designed hulls the buoyancy compensation in the extension sponsons should equal at least the amount of ballast added necessary to bring the bow down to a desirable angle when the design or largest motor package and necessary and desirable equipment is installed, including the load weight calculated for storage bins using Method 2, paragraph 2) listed below. This angle would usually be parallel with the water, though in certain circumstances, an angle slightly high or low could be desirable in the static, unloaded position. This is left to the designer to determine. This method is particularly useful when this trim, and longitudinal and lateral tracking system is adapted to an existing hull or hull design. The intention in this case would be to remove the need for ballast needed for trim, and, or, allow lighter stronger materials to construct a lighter hull.

Method 2) In the design for a hull using an outboard engine mounted as intended on a motor mount transom installed just ahead of, or toward amidships of the added extension sponsons (whether integral, or separately attached) the buoyancy in the sponsons should roughly equal the design or maximum design weight of the intended motor engine packages at the desired static draft plus any or all of the following:

1) Any fixed equipment or optional platforms such as 15 mounted with the engine or on the sponsons should be entered into this calculation.

2) Storage Bin Design and Locations for Safe Design

A) Any sealed storage bins 12 should include a design weight equal to the amount expected to be placed in specified sealed storage bin, or ½ the maximum listed weight capacity for the specified sealed storage bin, or 10 pounds per cubic feet of sealed storage bin space, whichever is greater. Storage bin hatches or covers that are not approved for marine conditions are not recommended. Storage bins should be designed not to retain water, or take on water, if possible.

Figure 18:
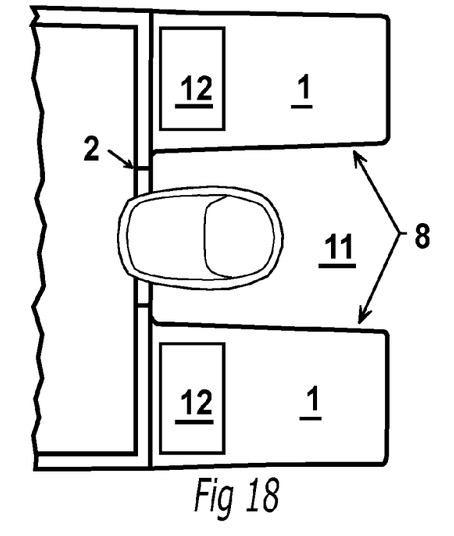
FIG. 18—Fragmentary overhead or top plan view showing the relationship of motor location and size to extension sponsons.
Figure 19:
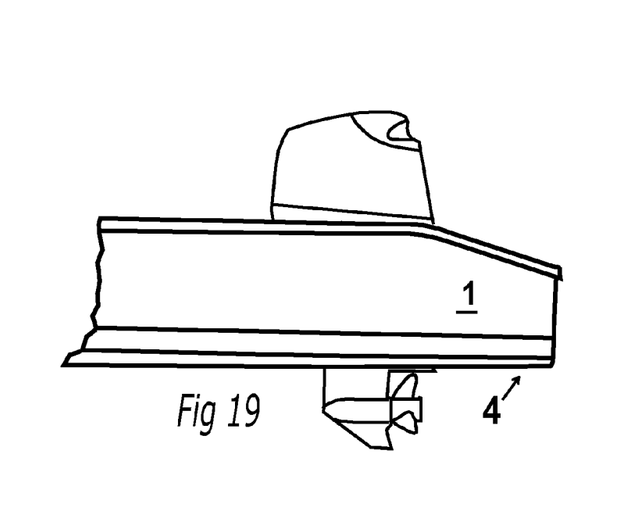
FIG. 19—Fragmentary side elevation showing that the upper surface of the sponson can be modified for a wide range of design variation. In this example, an angled rear deck is shown. Steps (not illustrated) could be inset into the angled portion for a lower stern dock or water entry.
Figure 20:
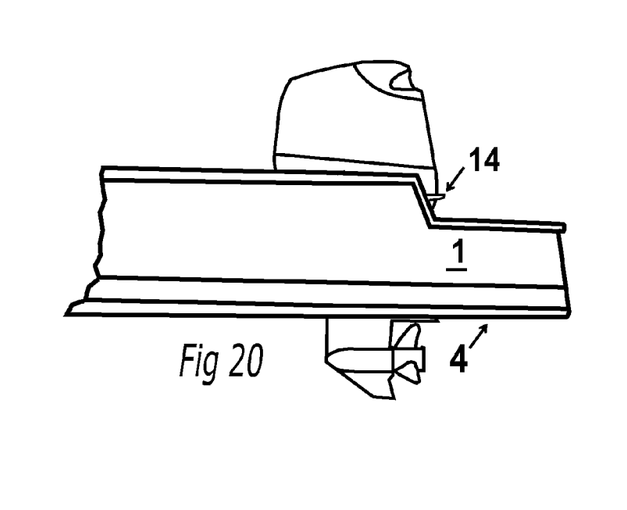
FIG. 20—Fragmentary side elevation showing that the upper surface of the sponson can be modified for a wide range of design variation. In this example, a lower loading deck is provided. A built in or added step 14 is also shown. Other variations could easily allow tumblehome, or classic boat-tail stern designs, or nearly any imaginable above waterline shape.
Figure 21:
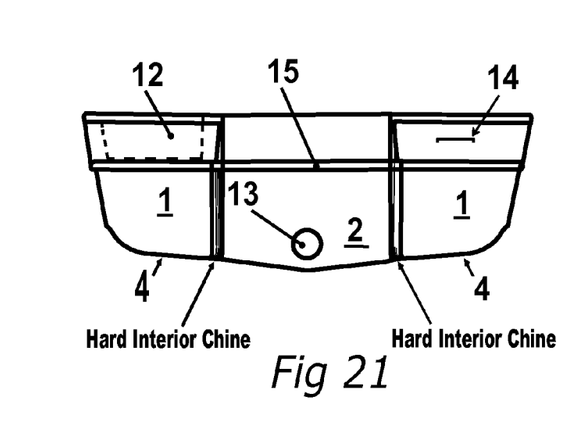
FIG. 21—Aft elevation

B) Storage bins should not be located astern of the centerline of the outboard motor in outboard motor applications, as depicted in FIG. 15,18.

Figure 22:
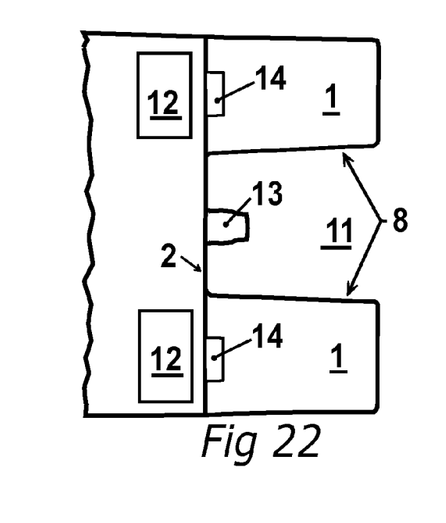
FIG. 22—Fragmentary overhead or top plan view showing relationship of motor location and size to extension sponsons with shorter modified sponson length for inboard motor.
Figure 23:
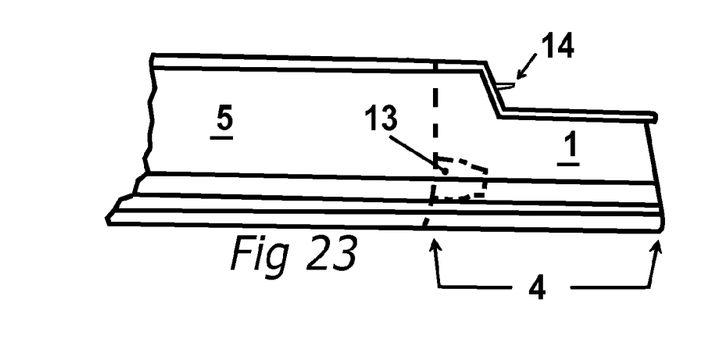
FIG. 23—Fragmentary side elevation showing jet pump nozzle, shorter extension sponsons 1, sponson planing pad 4 and lower stern suitable for a loading or swim deck.
Figure 24:
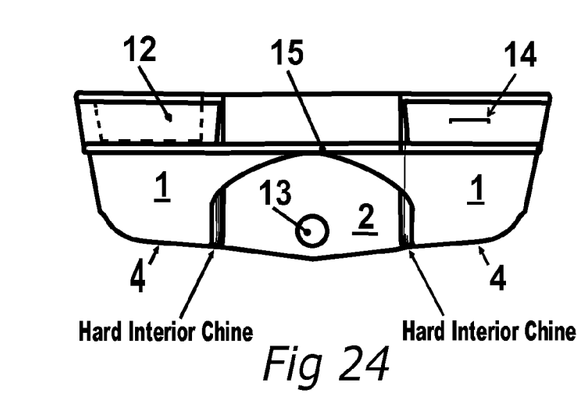
FIG. 24—Aft elevation showing a variation within the invention to provide a stronger deck support and stronger rear stern section by tying the sponsons together above the waterline with an arched hull section. The restricted area provided by the deck 15 turns the well 11 into a ventilated tunnel which would further reduce spray and noise.
Figure 25:
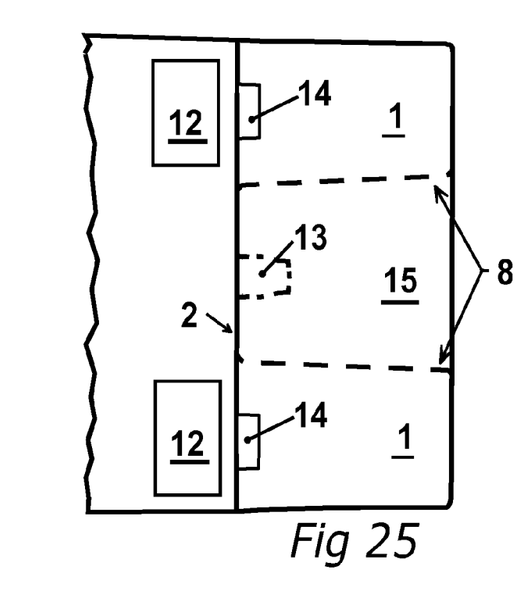
FIG. 25—Fragmentary overhead top plan view of extension sponsons with a continuous lower deck arrangement. This deck could alternately be at a higher elevation.

C) Storage bins should not be located directly on the extension sponsons on inboard engine designs. FIG. 22,25.

D) Storage bins should not be located further back on the stern due to two design considerations as listed:

a) Safety-Storage bins should not be located far back on the sponsons or in any location that would be hazardous in operation.

b) Buoyancy and Flotation—Storage bins should not be so large, so deep, or located so far back on the sponsons as to interfere with the design load calculations or buoyancy. Therefore, storage bins should generally not be located astern of the motor. They also should not extend below the maximum loaded waterline.

Exception to D)a)b):

Storage and fixed equipment may be included if sufficient safety equipment as per Coast Guard requirements and common sense dictates; and if all added equipment and storage load weights are entered into the buoyancy calculations; and the added storage and deck is located at, or above the freeboard or lowest watertight deck.

All information about storage bin design is intended as advisory to help in more complex applications of the extension sponson and Hard Interior Chines.

Note that inboard motor installations can use this sponson extension to create an overall lighter hull that planes quicker, but the easiest calculations will probably come from using Method 1 with inboard engine and drive systems.

The overall length of the extension sponsons should equal at least 18-23% of the overall boat length, including the extensions. In explanation, the sponson for a boat with a total length of 10 feet would constitute a typical sponson length of approximately 20%. Length of the stern sponson extensions is limited only by practical considerations. As an example, there would probably be no point in having the sponsons take up 50% of the boats length, as this would possibly limit the cargo capacity of most craft, and be completely unnecessary. In general, a larger, longer boat with a wider beam in relation to its length can use a slightly shorter extension in proportion to a shorter boat. While a narrow 10 foot boat requires around a 26-28" extension (21.5-22.75%) to support a 60 pound motor, a 20 foot boat could use an extension with a length (measured along the interior hard chines) of around 3 feet 6 inches to 4 feet 6 inches (18-21.5%) to support outboard motors from weighing 300 to over 600 pounds while meeting the design length for the interior chine. Inboard motors or smaller motors would require less interior chine length and a lower calculated buoyancy since a large part of the weight and thrust would be forward of the outboard motor mount position.

Interior chine length should typically be a minimum of about 13% of the total boat length for significant effect on tracking or oversteer. Longer Interior Hard Chine lengths will have more effect upon tracking and oversteer. Shorter chine lengths than 13% will still have an effect. In some designs Interior Hard Chines shorter than 13% may still have sufficient effect, particularly in existing designs needing lower hydrodynamic reinforcement.

For buoyant support of motor and cargo or gear to prevent tail dragging and the control of porpoising, only a simple buoyancy calculation is necessary. In most applications, this will result in extension lengths that will exceed the minimum interior chine calculations. If it does not, the sponson can be narrowed to lengthen the hard interior chine. The calculation for buoyancy should take into consideration the static draft desired at a static rated load for motor and any gear or equipment desired to be placed in, on, or near the sponsons.

For protection of an outboard motor in a tilted position the length of the extension sponsons should exceed the horizontal length of the tilted motor far enough to prevent most collision damage. A bar, platform, net, or bridge of any type could be used to slow or restrict penetration into the well between the sponsons, or as a handle to lift a light craft. This deck can be fixed, foldable, or removable.

For inboard installations, the sponsons may be joined at the top and could be designed as a deck. The well would then be closed at the top. This closed well would become a short tunnel. The only design restrictions to this tunnel are that the walls should still form the hard interior chines and the tunnel should still be tall enough to totally ventilate the tunnel.

Any deck formed at the rear may be lower than the highest part of the sponson. This deck and any top part of the sponson should not be lower than lowest waterline expected in normal operation if the best effects of the buoyancy advantages of this design are to be realized. While the extension sponsons 1 can still have full effect on the stern buoyancy of the craft, and the Hard Interior Chines would still provide their design function, water forces, such as are found in, but not limited to, a "following sea" could present other control or "swamping" issues. An extended structure past the aft of the hull could also present a hidden collision hazard. Therefore, while the hull extension sponson design can be underwater at rest, the disadvantages of doing this would probably make this impractical. This invention, therefore, covers the application of the design of sponsons having the Hard Interior Chine function, and buoyancy to fully support the motor, and, or fixed equipment located at, or past the motor or motor outlet, even if any area of the sponson is submerged during any normal operation, as defined earlier in the text.

Design of the Hard Interior Chines

Figures 26, 27, 28:
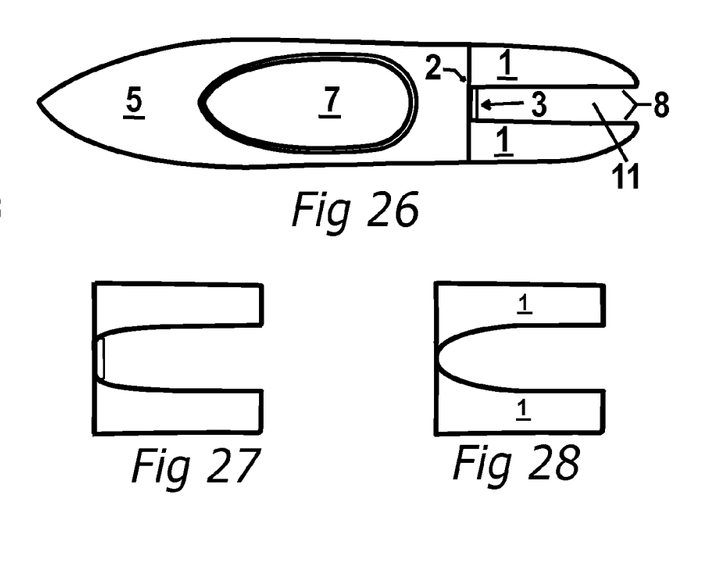
FIG. 26—Top plan view showing an alternate curved stern as another demonstration of a variation possible within the scope of the invention. This tapered stern could improve paddling characteristics while providing the advantages of the Hard Interior Chines, buoyancy, and the extension sponson planing pad.
FIGS. 27 and 28 are top plan views of examples of possible variations to the tunnel possible while still forming the Hard Interior Chines. The parallel or nearly parallel interior chine relationship as per the SPONSON EXTENSION CALCULATION design section should still total 13% or more of overall hull length for best results.

To be most effective, the Hard Interior Chines should not taper longitudinally more than 6° toward the respective outer sides of the boat on each side. The strongest tracking performance should be from a nearly parallel set of chines. A very slight taper of 2-3 degrees reduces friction while providing strong tracking. Even a 6° to 10° outward taper per side would still provide excellent control of oversteer or "slide out". The Hard Interior Chine can also be formed with a small longitudinal arc such as the examples in FIG. 27. This can provide a more parallel chine orientation for most of the length of the chine while narrowing the well near the motor mounting area. This strengthens the inner transom 2 by reducing the span. It can be used to prevent a larger class outboard motor from being installed while allowing more room to turn an outboard motor. The example in FIG. 28 is an example of a narrower inner transom suitable for a water jet installation.

The interior well is best formed with nearly vertical sides as this also forms the widest sponson planing pad 4. This also forms the sharpest angles for the Hard Interior Chine. Any inner well shape that still provides strong ventilation of the well while providing a hard chine immersed in the water during planing is suitable. A curved well formed by the sponsons 1 is optional and the hull walls of well can be used to provide support for a center deck 15, such as in FIGS. 24 and 25. A center deck may also be a flat fixed or removable panel such as in FIG. 21.

Steering Systems

For conventional hulls, any steering system currently in the art can be used.

Steering is quicker and sharper than a boat of the same length due to the drive system being located in a mid-rear engine position. Outboard motors and inboard/outboard outdrive systems will offer the quickest and sharpest steering with this hull extension. Quicker steering with a water jet outdrive can be facilitated by locating the outlet below the well and interior chines. An inboard motor driving a conventional non-steerable drive can be used with the output located in a similar location as the other drive systems. A rudder can be located at the rear of the craft as in FIG. 11,12 item 10 or under the boat in any suitable rearward location.

On very small boats with a narrow beam, such as modified kayaks and canoes, steering with a paddle is recommended. The boat featured in FIG. 1-12 is a practical example of small one person kayak-like craft that is designed to be steered with a kayak paddle. Alternately, a rudder, such as in FIG. 11, 12 item 10 can be used on the transom of one or both of the extension sponsons controlled by any available practical steering system. Many systems exist in the art, including, but not limited to, systems controlled by foot control, lever or steering wheels. A steerable jet pump or small outdrive can also be used as a drive and control system. This will provide very quick steering in a very small craft. Steering with a tiller at speeds higher than can be produced with an unmodified electric trolling motor are not recommended on canoe and kayak based designs with a sharp turning radius. As an example, since the steering radius can only be a maximum of about 8 feet on a 10 foot kayak, tiller steering should only be used to trim such a short boat.

Materials and Construction

This design can be made from a wide variety of materials and construction techniques including, but not limited to, formed metal or plastic, shaped, riveted, screwed, bolted or welded metal, plastic thermoforming, blow molding, vacuum-forming, composite reinforced molding, injection molding, wood or plywood, fabric skin on frame fabrication, or rotational molding.

It can be integrated into an existing hull design or attached separately. The sponsons can be permanently attached or detachable.

If the sponsons are installed as separate chambers attached to the hull, they may be installed as permanent attachments or detachable hull members.

Sponsons may be attached by almost any workmanlike means to the transom, referred to as the inner transom 2 in the specifications of the invention. These means include, but are not limited to, screws, bolts, clamps, latches, dovetail mounts, bonding, welding, glue, pinning, nailing, seaming, hooks, cables, ties or locking.

It would be impractical to present all the possible modifications of the embodiment that will be immediately apparent to those skilled in the art. Therefore the core embodiment is intended to cover any further modifications, changes or omissions that may be made by one skilled in the art without departing from the scope and spirit of the invention.

What is claimed is:

1. A buoyant stern mounted hull extension for a watercraft that is comprised of two buoyant, sealed sponsons that are attached or formed as rigid extensions of a stern of said watercraft, one of said sponsons being attached or integrally formed as an extension on a port side of said stern, astern of a propulsion system mounting transom, and the other of said sponsons being attached or integrally formed as an extension on a starboard side of said stern, astern of said transom, said sponsons having outer wall surfaces that match a shape of a parent hull at an attachment point, said sponsons being separated by a longitudinal well that is open to an aft end of said watercraft and is closed off amidships, said sponsons forming parallel vertical surfaces that extend longitudinally on either side of said well, said well being wide enough to allow amidships placement of an inboard or outboard propulsion device at an interior amidships transom formed between said sponsons, said sponsons provide buoyant support equal to or greater than the weight of the propulsion system and other fixed hardware installed in or on the rear section of the boat, said well may be long enough to protect the outdrive in raised horizontal position, said well may be narrow enough to restrict the size of the propulsion device, where bottom surfaces of said sponsons extend planing surfaces of the hull in the same plane astern of said amidships transom to form an extension of a planing pad of said hull, said planing pad on an underside of said sponsons intersecting at right angles to lower interior surfaces of said well to form interior hard chines.

2. The two sponson hull extensions described in claim 1 inner vertical surfaces form a centered well that angles in at the top of the well by up to 10 degrees from a vertical axis in toward the center of the well.

3. The two sponson hull extensions described in claim 1 inner longitudinal surfaces form a centered well that opens toward the stern at up to 10 degrees per side from a longitudinal centerline.

4. Alternately, the transom described in claim 1 has an additional vertically mounted rigid plate used as a motor mount for a removable outboard type engine.

5. The sponsors hull extensions in claim 1 have a solid material deck constructed of materials comprising, but not limited to, wood, metal, plastic, composites, cloth, vinyl, or leather, attached between the sponsons over the well.

6. The sponson hull extensions in claim 1 have a rigid bar attached between the sponsons over the well for a rigid support, a handle, or to prevent entry to the well by foreign objects.

7. The sponson hull extensions in claim 1 are removable from the amidships transom.

\* \* \* \* \*